Figure 1:
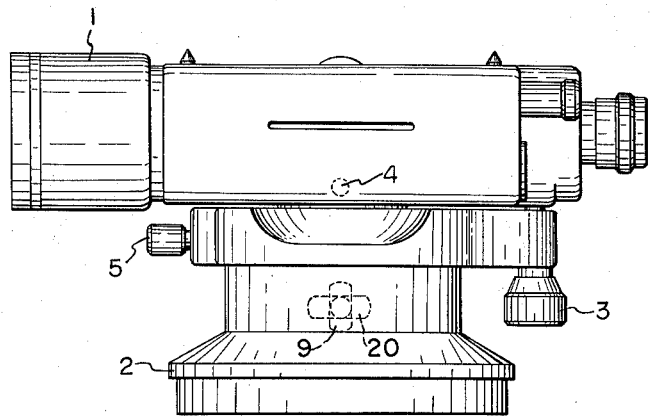

Sept. 21, 1965  HARUO ESUMI ETAL  3,206,853
SPHERICAL SEAT TYPE LEVEL
Filed March 9, 1962

INVENTOR.
HARUO ESUMI AKIO HANDA
BY
ATTORNEY.

United States Patent Office 3,206,853
Patented Sept. 21, 1965

3,206,853
SPHERICAL SEAT TYPE LEVEL
Haruo Esumi and Akio Handa, Shinagawa-ku, Tokyo, Japan, assignors to Nippon Kogaku K.K., Tokyo, Japan, a corporation of Japan
Filed Mar. 9, 1962, Ser. No. 178,599
1 Claim. (Cl. 33—73)

This invention relates to an improved tilting level of the spherical seat type.

A transit or level is conventionally leveled roughly by using three or four leveling screws, but considerable skill is required for leveling rapidly. On the other hand, since in the tilting level the horizon of the eye-level line must be precisely set each time by the tilting mechanism, the leveling stand is not required to be leveled as precisely as in a transit. Therefore, it is desirable that the latter be leveled more rapidly and easily. Also, since the fit of the leveling screw must be very precise to make the conventional leveling apparatus reliable and strong, it is fairly expensive to manufacture.

Some surveying instruments have leveling screws, which have a spherical bottom plate and a spherical seat at the head of the tripod supporting the spherical bottom plate to reduce the difficulty of adjusting the horizon. These are not simple to handle and, moreover, have the disadvantage that this structure requires a special tripod. In the present invention, the leveling screw of the tilting level is eliminated and a general tripod can be utilized by leveling and securing a horizon stand directly to the spherical seat bottom plate.

Figure 2:
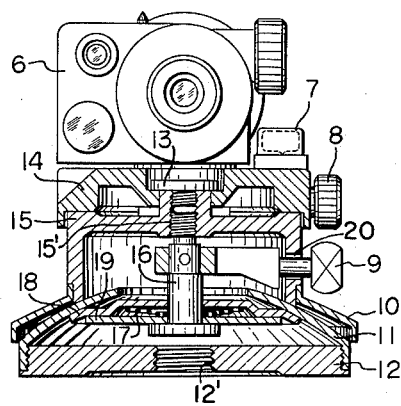

A clear concept of the scope and purpose of this invention may be obtained from the following description of an illustrative embodiment when read in conjunction with the drawing in which:

FIGURE 1 shows the side view of the embodiment of the convex spherical seat of this invention; and FIGURE 2 shows the central vertical cross-sectional view of the leveling stand of the embodiment of FIGURE 1.

The telescope 1 is connected with the upper rotatable stand 14 of the leveling stand 2 by the horizontal shaft pin 4 and can be directed upwardly and downwardly by revolving the fine vertical adjustment screw 3 provided in rotatable stand 14. 5 is a rotating set screw and 8 is a rotatable fine adjustment screw. The main bubble tube is present in a bubble tube room 6 of the telescope and the eye-level line of the telescope can be adjusted so as to be horizontal by rotating the screw 3 to bring the bubble to the central position. The rotatable stand 14 is positioned on the horizontal stand 15 and rotates around the central projecting boss of the stand 15. 13 is a screw for preventing the stand 14 from moving up. Since the circular bubble tube 7 for leveling is fixed on the rotating stand 14, the upper surface of the stand 14 and the horizontal shaft pin 4 become horizontal by moving the horizontal stand 15 so as to bring the bubble in the bubble tube 7 to the center of the tube. The spherical seat 11 has spherical surfaces at both its inside and outside surfaces. The outer surface of the seat 11 contacts with the horizontal stand 15 while its inner surface contacts with the spherical surface pressing plate 18, the stand 15, having a central threaded bore 15′ into which a securing screw 16 is screwed, being engageable to the seat 11 by screwing up the securing screw 16 at the center of the leveling stand 2 by the handle 9, which projects laterally from the stand 15 through an aperture 20. 19 is a washer which strengthens the spherical surface pressing plate 18, and 17 is a spiral spring for producing appropriate friction between stand 15 and seat 11 even when the handle 9 is loosened. 10 is a cover protecting the spherical seat 11. The spherical seat 11 is affixed to the bottom plate 12. At the center of the bottom plate 12, a central threaded bore 12′ is provided for receiving the threaded center rod of the tripod of general surveying instruments, the plate 12 being screwed tightly on the center rod.

The operation and the action of above-mentioned embodiment are clearly explained as follows.

The spherical seat 11 having the bottom plate 12 is first tightly threaded on the center rod of the head of the tripod for general surveying instruments. Then, the securing screw 16 is loosened by rotating the handle 9. By so doing, the spherical pressing plate 18 is pressed to the backside of the spherical seat 11 by an appropriate pressure produced by the spiral spring 17 so that the upper main body is prevented from shaking. Then, the horizontal stand 15 is slidably moved along the spherical surface so as to adjust the inclination of the horizontal stand to bring the bubble in the bubble tube 7 to its center position. The handle 9 is now rotated to lift the plate 18 and the horizontal stand 15 is fixed to the spherical seat 11. If the sensitivity of the bubble tube is made to be 2 mm. per degree, it is easy to bring the bubble almost to the center of the bubble tube by hand operation without any fine adjustment equipment.

Then, when the telescope 1 is moved upwardly or downwardly by rotating the vertical fine adjustment screw for adjusting the bubble of the main bubble tube to its central position, the eye-level line of the telescope becomes completely horizontal.

What we claim is:

A surveyors level comprising a telescope, a support comprising
  a horizontal stand having a central vertical threaded bore,
  a spherical seat contacting with the bottom of the horizontal stand for roughly correcting the eye-level line, the spherical seat having an outer convex and an inner concave spherical surface, the outer convex surface bearing the horizontal stand,
  an underlying pressing plate in contact with the inner concave spherical seat surface, each of the horizontal stand and the pressing plate being slidable on the respective spherical surface,
  a bottom plate having a flat surface at its bottom affixed to the lower end region of the spherical seat, the bottom plate defining a threaded central bore for receiving the threaded center rod of tripods of the flat-surfaced head structure type for general surveying instruments,
  a securing screw threaded into the threaded bore of the stand and positioned in the interspace between the stand and the bottom plate for connecting the stand with the pressing plate to press them against their respective surfaces of the seat,
  a washer plate on the securing screw,
  a spiral spring positioned between the washer plate and the pressing plate in such manner as to procure appropriate friction between the stand and the seat, and
  a handle projecting sidewise from the stand for operating the securing screw.

References Cited by the Examiner

UNITED STATES PATENTS

| | | | |
|---|---|---|---|
| 209,562 | 11/78 | Gurley | 248—181 |
| 368,308 | 8/87 | Richardson | 248—181 |
| 673,262 | 4/01 | Hine | 248—181 |
| 2,592,941 | 4/52 | Moore | 248—181 |

FOREIGN PATENTS 285,112   2/28   Great Britain.

ISAAC LISANN, *Primary Examiner.*